May 17, 1966  J. HEDU  3,251,110
CLASP
Filed Sept. 27, 1963
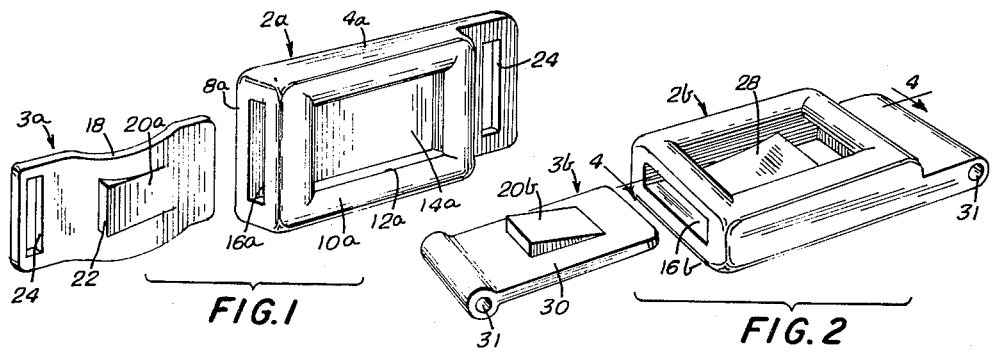
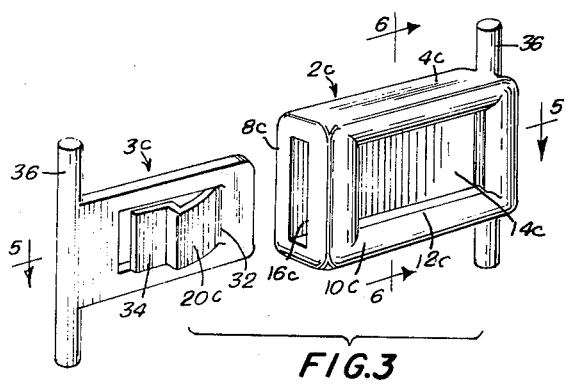
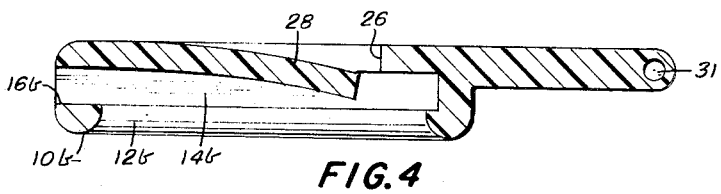
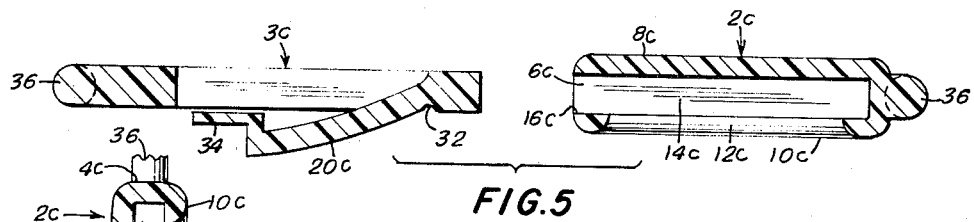
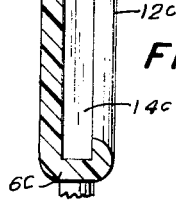
INVENTOR
*JON HEDU*
BY Beale and Jones
ATTORNEYS

3,251,110
CLASP
Jon Hedu, Watertown, Conn., assignor to Watertown Manufacturing Company
Filed Sept. 27, 1963, Ser. No. 312,218
2 Claims. (Cl. 24—230)

This is a continuation-in-part of application Serial No. 226,828, filed September 28, 1962, now Patent No. 3,196,878.

This invention relates to a clasp fastener having a pair of slidably disconnected sections. The subject fastener is suitable for a variety of uses in garments, jewelry, keychains or whenever it is desired to detachably hold together two articles.

It is an object of this invention to provide a disconnectable fastener which is easily engaged and disengaged, and which is constructed in a manner to give long, trouble-free service.

Another object is to provide an inexpensive, attractive clasp fastener.

The clasp has a socket member and an insert member which slidably fits within and locks to the socket member. The socket is formed of four walls which define an open-ended hollow cavity therebetween. One wall of the socket has an aperture therein. The insert member is adapted to slide through the open end of the socket into the cavity. A tapered shoulder projects from the insert member into the socket aperture to hold the members together. Means are provided to bias the shoulder into the aperture; and means are also provided for attaching each of the clasp members to a garment or other article.

The above and other advantages will be apparent from the following description and the accompanying drawings wherein;

FIG. 1 is a perspective view of a first embodiment of the invention;

FIG. 2 is a perspective view of a second embodiment of the invention, shown lying flat;

FIG. 3 is a perspective view of a third embodiment of the invention;

FIG. 4 is a sectional view of the socket member used in the second embodiment, taken along the line 4—4 in FIG. 2;

FIG. 5 is a sectional view of the insert member and socket member of the third embodiment, taken along the line 5—5 in FIG. 3; and FIG. 6 is a sectional view of the socket member, taken along the line 6—6 in FIG. 3.

The clasps of all three modifications are preferably made of resilient plastic material and they are adapted to be made by conventional injection molding techniques. All of the illustrated modifications have socket members of similar construction best seen in FIG. 3 and the sectional views shown in FIGS. 5 and 6.

It will be seen that the socket 2c may be described as having four planar walls; a top wall 4c, a bottom wall 6c, a rear wall 8c, and an apertured front wall 10c. A relatively large aperture 12c consumes a major portion of the front wall.

These walls define an elongated cavity 14c which runs longitudinally within the socket. The cavity has an opening 16c at one end, and the opposite end may be closed or open as desired. The central axis through opening 16c is generally perpendicular to the central axis through the aperture 12c.

Having generally described the configuration of the socket member, the various embodiments of the invention will now be discussed in detail. In the drawings, like numerals in the embodiments indicate similar components; letters have been added for further identification.

Turning to the FIG. 1 embodiment, it will be noted that an insert member 3a is adapted to be slidably inserted into the cavity 14a through the opening 16a. The insert member 3a comprises a thin resilient strip of material which has a curved portion 18 at its midsection. The axis of curvature of this portion 18 lies parallel to a transverse axis of the strip and thus in a plane parallel to the plane in which the strip generally lies.

A shoulder 20a is aligned with the socket aperture and it is located at the crest of the curve. The shoulder is tapered outwardly from the face of the curved strip. The outermost edge 22 of the shoulder preferably extends out beyond the crest of the curve.

It may be seen that as the insert member 3a is slipped into the socket, the resilience of the insert member will permit it to yield, flattening the curve to permit the shoulder 20a to pass through the opening 16a. When the shoulder come into alignment with the aperture 12a, the resilience of the strip will bias the shoulder outwardly to lock the insert member within the socket. The clasp may be detached by depressing the shoulder 20a with a finger, and sliding the members apart.

As illustrated, the fasteners of FIG. 1 may be attached to a garment or other article to be fastened by means of an elongated eye 24, through which thread or a loop may pass.

The second embodiment of the invention, shown in FIGS. 2 and 4, has a socket with a modified rear wall 8b. This wall, which may be planar as shown, has a curved elongated slit 26, generally U-shaped, which defines a resilient tongue 28. See FIG. 4. This tongue connects to the remainder of the rear wall at its end nearest the opening 16b. As seen in FIG. 4, the tongue 28 is inclined from the wall to extend into the cavity 14b.

The insert member 3b of this embodiment comprises a flat strip 30 which need not be resilient, having a tapered shoulder 20b on its outer face.

The dimensions of the insert member 3b are such that it may be inserted into the socket through the opening 16b. When the member 3b is inserted, it will encounter the tongue 28 which will urge the insert member 3b outwardly to lock the shoulder in the aperture 12b. The members 2b and 3b may be detached by pressing on the shoulder 20b and pulling the members apart.

The members 2b and 3b have small transversely extending bores 31 which comprise the means for attaching them to the articles to be fastened. A wire C-ring is useful for connecting to this type of attaching means.

The third embodiment is shown in FIGS. 3, 5 and 6. The socket member of this device has been described above in detail.

This embodiment uses an insert member with a shoulder which is resiliently deflectable from the remainder of the insert member. A major portion of this shoulder 20c is surrounded by an elongated slit having a U-shape. The shoulder is sufficiently thin to give it resilience, which may be increased by hollowing out a small portion 32 at the juncture of the shoulder and the remainder of the insert member. This shoulder 20c also tapers outwardly from the face of the insert member.

A tang 34 may be made integrally with the resilient shoulder 20c. This tang limits somewhat the extent to which the shoulder may move outwardly when within the socket. This serves to keep the members together more snugly since some biasing force is still exerted by the resilience of the shoulder when the members are locked together. Also, the tang prevents the shoulder from being bent outwardly when a strong tensile force is placed on the interlocked members.

In this third embodiment, when the members are slidably placed together, the shoulder will depress as it passes through the opening 16c. The shoulder will then snap out to lock into the aperture 12c. This clasp is detached in a manner similar to that described above in regard to the first and second embodiments.

The illustrated means for attaching the members of the third embodiment to an article is a transverse pin like projection 36 which may be held in an apertured holder or by any other suitable means.

In the above discussion, the structure and operation of the three embodiments of a most useful clasp assembly have been set forth. Many design changes will occur to those skilled in the art. For example, any of the means for attaching a clasp to an article may be used on any embodiment of the clasp. It is, of course, understood that the scope of this invention is defined by the following claims, and not limited only to the described embodiments.

I claim:
1. A clasp assembly comprising a socket member and an insert member, said socket member having a cavity internally formed therein and an opening at one end leading into said cavity, a first side wall of said socket having an aperture therethrough with its central axis generally perpendicular to a central axis of said opening, a second side wall of said socket lying opposed to said first side wall, said insert member being slidably received through said opening into said cavity, said insert member including a thin curved strip of resilient material having lower and upper surfaces on opposite sides thereof and an axis of curvature approximately parallel to a transverse axis of said strip, a locking shoulder rigidly secured to a crest of said curved strip on said upper surface and located for locking engagement within said aperture said lower surface contacting said second side wall on both sides of said shoulder.

2. A molded plastic clasp assembly comprising a socket member and an insert member, said socket member having four integral planar walls joined along their edges to define a longitudinally extending cavity of quadrilateral cross-section, said walls being spaced apart by constant distances and defining an opening at one end of said socket, one of said walls having an apertured portion with a transversely extending aperture generally centrally located therein, said insert member having a configuration similar to that of said cavity and adapted to be slidably received with a close fit through said opening in said cavity, said insert member having a thin curved strip of resilient material with an axis of curvature approximately parallel to said strip, said insert member having a shoulder located rigidly at a crest of said strip, said shoulder having a raised locking abutment and a portion outwardly tapered from said insert member, said abutment being closer to said opening at one end of said socket than to a furthest inserted end of said insert member, said one of said walls covering and enclosing said insert member at its end and side marginal edges, means on said socket remote from said opening for attaching said socket to an article to be fastened and means on said insert member remote from said tapered portion for attaching said socket to an article to be fastened.

References Cited by the Examiner

UNITED STATES PATENTS

| | | | |
|---|---|---|---|
| 462,914 | 11/1891 | Pilkington | 24—230 |
| 797,953 | 8/1905 | Gurren | 24—230 |
| 1,499,428 | 7/1924 | Wagner | 24—230 |
| 2,240,012 | 4/1941 | Freysinger | 24—230 |
| 2,495,667 | 1/1950 | Vizner | 24—230 |
| 2,856,221 | 10/1958 | Orcel | 292—303 |
| 2,964,937 | 12/1960 | Lautin | 24—230 |
| 2,986,792 | 6/1961 | Wyatt | 24—230 |
| 3,009,227 | 11/1961 | Ryan | 24—230 |

FOREIGN PATENTS

| | | |
|---|---|---|
| 730,372 | 8/1932 | France. |
| 892,342 | 4/1944 | France. |
| 901,042 | 7/1945 | France. |
| 1,128,175 | 1/1957 | France. |
| 180,611 | 1/1907 | Germany. |

WILLIAM FELDMAN, *Primary Examiner.*

DONLEY J. STOCKING, *Examiner.*